United States Patent [19]

Mizuno et al.

[11] 4,426,613
[45] Jan. 17, 1984

[54] CONTROL SYSTEM FOR A SELF-EXCITED ALTERNATING CURRENT GENERATOR

[75] Inventors: Masamitsu Mizuno, Toba; Kazuomi Itoh; Masahiro Urushibara, both of Ashikaga, all of Japan

[73] Assignee: Hokuetsu Industries Co., Ltd., Niigata, Japan

[21] Appl. No.: 478,627

[22] Filed: Mar. 23, 1983

[51] Int. Cl.³ ............................. H02P 9/10; H02P 9/14
[52] U.S. Cl. ........................................ 322/21; 322/19; 322/25; 322/86
[58] Field of Search ................. 322/17, 18, 19, 20, 322/21, 28, 59, 60, 25, 85, 86, 87; 361/20, 21

[56] References Cited

U.S. PATENT DOCUMENTS

| | | | |
|---|---|---|---|
| 3,314,000 | 4/1967 | Rosenberg et al. | 322/19 X |
| 3,818,317 | 6/1974 | Isono et al. | 322/21 |
| 3,863,137 | 1/1975 | Mishima et al. | 322/87 X |
| 3,899,731 | 8/1975 | Smith | 322/28 X |
| 4,336,486 | 6/1982 | Gorden et al. | 322/87 X |

*Primary Examiner*—R. J. Hickey
*Attorney, Agent, or Firm*—Koda and Androlia

[57] ABSTRACT

A control circuit for a self-excited AC generator including an automatic voltage regulator, a fly-wheel capacitor which is charged normally by part of the generator output during a no-load operation or small-load operation of the generator, a detection circuit which detects a drop of the generator output voltage when said output voltage drops below the predetermined value, and a field current control circuit which operates on the fly-wheel capacitor to discharge the stored electric energy to the field winding of the generator or an exciter equipped with the generator when the detection circuit detects a drop of the generator output voltage. The control circuit provides additionally with the second field current control circuit which supplies a current from the generator output terminal to the field winding through a rectifier when the detection circuit detects a drop of the generator output voltage.

8 Claims, 3 Drawing Figures

CONTROL SYSTEM FOR A SELF-EXCITED ALTERNATING CURRENT GENERATOR

BACKGROUND OF THE INVENTION

1. Field of the Invention:

The present invention relates to a control system for a self-excited alternating current (AC) generator, particularly to a self-excited AC generator powered by an internal combustion engine, wherein part of the generator output is rectified by an automatic voltage regulator so as to be used as a power source for the field winding of the generator or an exciter equipped with said generator.

2. Description of the Prior Art:

When a self-excited AC generator is loaded with an induction motor, a starting current more than six times larger than the rated current of the induction motor flows through the output terminals of the generator during a start-up period of the induction motor. The starting current, in cooperation with the synchronous impedance of the generator, causes a large voltage drop in the generator, resulting in a significant voltage drop of the generator output. This phenomenon not only affects other loads connected to the generator output, but also causes a drop of the voltage applied to the field winding of the generator or exciter thereof, resulting in a reduced field current, and thus in a drop of the generator output voltage. If the generator is loaded with an induction motor having a relatively large capacity, the generator will be incapable of generating power at the starting of the induction motor. The above-mentioned large voltage drop of the generator output cannot be compensated by the prevalent automatic voltage regulator. Therefore, the self-excited AC generator powered by an internal combustion engine needs to have a capacity of from two to four times the capacity of the induction motor to be connected in order to prevent the disability of power generation during the start-up period of the induction motor.

SUMMARY OF THE INVENTION

It is a primary object of the present invention to solve the deficiencies of the foregoing prior art and to provide a control system for a self-excited AC generator, particularly to a self-excited AC generator powered by an interval combustion engine, which allows the generator to start an induction motor having a capacity as large as that of the generator itself.

More particularly, an object of the present invention is to provide a control system for a self-excited AC generator capable of starting an induction motor having a capacity as large as that of the generator itself, which is capable of storing electric energy having a terminal voltage several times higher than the rated field voltage of the generator or exciter while the generator is running, and discharging stored electric energy to the field winding when the induction motor connected to the generator is started.

The present invention relates to a control system for a self-excited AC generator wherein part of the generator output is rectified at an automatic voltage regulator so as to be used as a power source for the field winding of the generator or exciter equipped with said generator, said control system comprising a fly-wheel capacitor connected through a rectifier to the output of the generator and adapted to be charged normally by part of the generator output, a detection circuit connected at the output of the generator and adapted to detect a drop of the generator output voltage caused by a generator load current in excess of a predetermined value and also detect the recovery from the voltage drop, and a field current control circuit which closes a circuit for connecting the fly-wheel capacitor to the field winding in parallel to the automatic voltage regulator when the detection circuit detects a drop of the generator output voltage and opens the circuit connecting the fly-wheel capacitor to the field winding when the detection circuit detects the recovery of the generator output voltage, whereby electric energy stored in the fly-wheel capacitor is discharged through the closed field current control circuit to the field winding when the detection circuit detects a drop of the generator output voltage resulting supplying a field current having a value several times larger in magnitude than the normal current value to the field winding and recovering the voltage drop of the generator output.

According to the present invention, the control system is further provided at the output of the generator with a second field current control circuit which is connected in parallel to the automatic voltage regulator and in series to the rectifier and the field winding and adapted to close as to supply a current through the rectifier to the field winding when the detection circuit detects a drop of the generator output voltage and open when the detection circuit detects the recovery of the generator output voltage, whereby electric energy stored in the fly-wheel capacitor is discharged to the field winding through said first named field current circuit, and further an electricmagnetic closed loop circuit beginning with the generator output terminal voltage, to the field voltage, to the field current, to the field magnetic flux, to the armature electromotive force, and back to the generator terminal voltage is formed through said second field current control circuit, when the detection circuit detects the voltage drop of the generator resulting strengthening of the field voltage and the field current due to the effect of positivefeedback amplification of said closed loop circuit.

BRIEF DESCRIPTION OF THE DRAWINGS

A better understanding of the present invention will be obtained by reference to the detailed description below, and to the attached drawings, in which.

DESCRIPTION OF THE PREFERRED EMBODIMENTS

Figure 1:
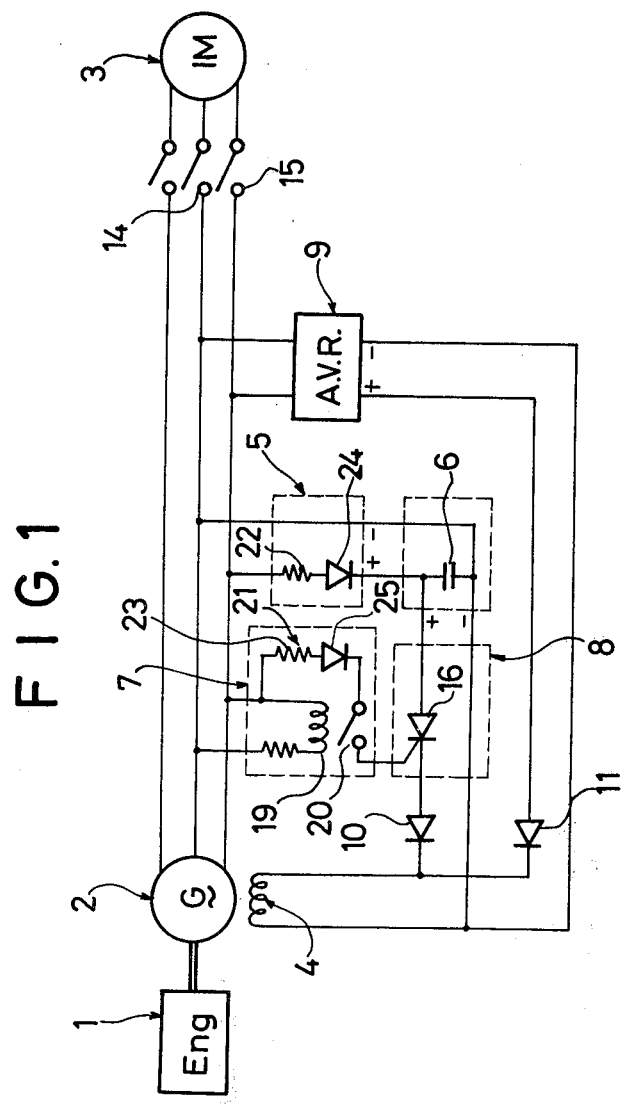
FIG. 1 is a schematic diagram showing one embodiment of the present invention.

FIG. 1 shows in schematic diagram one embodiment of the present invention. A self-excited AC generator 2 has its main shaft connected to the drive shaft of an internal combustion engine 1 such as a Diesel engine. A field winding 4 of the generator 2 is connected between the positive and negative terminals of an automatic voltage regulator 9 which is connected between output terminals 14 and 15 of the generator 2. The automatic voltage regulator 9 is of a known type operating in such a way that when the output voltage of the generator 2 drops, the regulator raises the voltage applied to the field winding 4 automatically so as to compensate the generator output voltage.

At the output of the generator 2, a rectifier 5 and a fly-wheel capacitor 6 are connected in series between the generator output terminals 14 and 15 so that the fly-wheel capacitor 6 is normally charged through the rectifier 5, and the fly-wheel capacitor 6 has another connection to form a closed circuit in series to the field winding 4 of the generator 2 through a field current control circuit 8. In particular, the fly-wheel capacitor 6 has its positive terminal connected to the anode of a thyristor 16 within the field current control circuit 8, while the cathode of the thyristor 16 is connected to one end of the field winding 4 corresponding to the positive terminal of the automatic voltage regulator 9. The negative terminal of the fly-wheel capacitor 6 is connected through a line within the field current control circuit 8 to another end of the field winding 4 corresponding to the negative terminal of the automatic voltage regulator 9.

Also provided at the output of the generator 2 is a detection circuit 7 which detects a drop of the generator output voltage caused by a load current in excess of the predetermined value. In this embodiment, the detection circuit 7 is arranged as a voltage-detection type circuit made up of an electromagnetic contactor including a winding 19 connected between the output terminals 14 and 15 of the generator 2 and a contact 20 (normally-closed contact and known as a b-contact of the electromagnetic contactor) which is closed when the voltage applied to the winding 19 has dropped below the predetermined level, and a rectifier 21 which connects the input terminal of the contact 20 to the output terminal 15 of the generator 2 so as to supply a DC current to the input terminal of the contact 20. The contact 20 has its output terminal connected to the gate of the thyristor 16 within the field current control circuit 8, so that when the detection circuit 7 operates to close the contact 20 a trigger current is supplied to the gate of the thyristor 16 and the thyristor 16 is brought into a conductive state, thereby connecting the fly-wheel capacitor 6 to the field winding 4 in parallel to the automatic voltage regulator 9. The rectifiers 5 and 21 are made up of a series connections of a resistor 22 and diode 24, and a resistor 23 and diode 25, respectively. Reference numerals 10 and 11 denote diodes, respectively.

In the above embodiment, where the generator 2 is loaded with an induction motor 3, a starting current six times larger than the rated current flows through the induction motor during a start-up period, causing in cooperation with the synchronous impedance of the generator 2 a large voltage drop within the generator 2, and the output voltage of the generator 2 drops significantly. At this moment, the detection circuit 7 senses the voltage drop and closes the contacts 20 of the magnetic contactor so that a DC current produced by the rectifier 21 is supplied as a trigger current to the gate of the thyristor 16. Then the thyristor 16 is brought into a conductive state, and the field current control circuit 8 forms a closed circuit including the fly-wheel capacitor 6 and diode 10 in series to the field winding 4, of the generator so that electric energy stored in the fly-wheel capacitor 6 are discharged to the field winding 4. The diode 11 has its anode connected to the positive terminal of the automatic voltage regulator 9 and its cathode connected to the field winding 4, while the diode 10 has its anode connected to the cathode of the thyristor 16 and its cathode connected to a line connecting the field winding 4 to the diode 11. Accordingly, with a provision of the fly-wheel capacitor 6 which is connected at the output of the generator 2 and is capable of being charged to a voltage in a value several times, e.g., 3 to 7 times, higher than the value of rated field winding voltage of the generator and is further charged through the rectifier 5 during a no-load operation or a small-load operation, the fly-wheel capacitor 6 discharges the stored electric energy to the field winding 4 when the detection circuit 7 detects a voltage drop caused by the overload, causing a field current several times larger than the normal value to flow in the field winding 4 thereby to sharply increase magnetic flux of the field, and consequently the voltage drop of the generator output recovers promptly. Although the terminal voltage of the automatic voltage regulator 9 stays low in this period, the presence of the diode 11 prevents charges in the fly-wheel capacitor 6 from flowing into the automatic voltage regulator 9.

After the induction motor 3 has started and the rotational speed has reached to the rated rotational speed, causing the load current of the generator 2 to approach the rated value, the output voltage of the generator 2 may rise to a rated voltage range. When the voltage applied to the detection circuit 7 has recovered, the contact 20 of the magnetic contactor opens. With the end of the discharging of the fly-wheel capacitor 6, the terminal voltage of the capacitor drops. Then, with the provision of the resistor 22 connected in series with the diode 24 within the rectifier 5, the current flowing through the thyristor 16 decreases below the holding current of the thyristor 16, and the thyristor 16 is turned off. Accordingly, the field current control circuit 8 is open-circuited and, at this point of time, the terminal voltage of the automatic voltage regulator 9 is recovered following the recovery of the generator output voltage, and the rated field current is supplied from the automatic voltage regulator 9 to the field winding 4, and the normal state is restored.

In the embodiment described heretofore, as the fly-wheel capacitor 6 connected through the rectifier 5 to the output of the generator 2 is charged during a noload operation or a steady-state operation of the generator 2, the fly-wheel capacitor 6 quickly discharges the electric energy stored therein to the field winding 4 of the generator 2 in a value several times larger than the value of rated field current of the generator 2 when the induction motor 3 is loaded to the generator 2 and a voltage drop of the output terminals caused by a heavy duty at the starting of the induction motor 3 is detected by the detection circuit 7, therefore the output voltage of the generator 2 can be recovered promptly. Accordingly, this embodiment allows the self-excited AC generator 2 to readily start the induction motor having a capacity as large as that of the generator.

Figure 2:
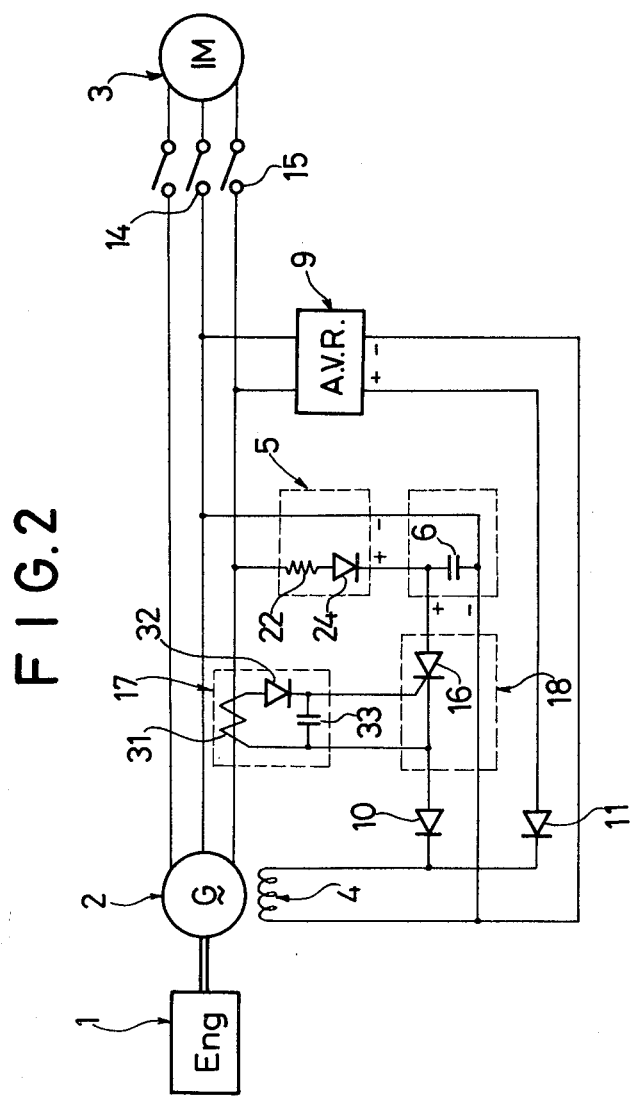
FIG. 2 is a schematic diagram showing the modified version of the embodiment shown in FIG. 1.

FIG. 2 shows a modified version of the previous embodiment, and the new arrangement only differs from the previous embodiment in the use of a detection circuit 17 of the current detection type, and remaining portions are identical to the arrangement of FIG. 1 and the same reference numerals are used for showing identical portions.

The detection circuit 17 is arranged such that a current transformer 31 is provided on the line between the generator 2 and the output terminal 15 with one end of the secondary winding of the current transformer 31 being connected to the anode of a diode 32 which has its cathode connected to the gate of the thyristor 16 provided within the field current control circuit 18 and with another end of the second winding of the current transformer 31 being connected to the cathode of said thyristor 16 so as to form a closed circuit, and a capacitor 33 is provided in parallel to the current transformer 31 through the diode 32.

According to the arrangement of FIG. 2, when the output voltage of the generator 2 falls due to a load current larger than the steady-state current, a large current is induced in the current transformer 31 and the current is rectified by the diode 32 and supplied as a trigger current to the gate of the thyristor 16, causing the thyristor 16 to turn on into a conductive state and the field current control circuit 18 is closed. Therefore, the same effects as of the arrangement in FIG. 1 are achieved. The capacitor 33 in FIG. 2 is provided to smooth the current flowing to the gate of the thyristor 16, and this smoothing function provides the accurate timing for turning on the thyristor 16.

After the induction motor 3 is started and the output voltage of the generator 2 is recovered to a voltage as high as the rated output voltage, the fly-wheel capacitor 6 has a lower terminal voltage due to the end of discharging. At the same time, due to the provision of the resistor 22 connected in series to the diode 24 within the rectifier 5, the current flowing in the thyristor 16 decreases below the holding current, causing the thyristor 16 to turn off, and the field current control circuit 18 is open-circuited. Then the rated field current is supplied from the automatic voltage regulator 9 to the field winding 4, and the normal operating condition is restored as in the case of the embodiment shown in FIG. 1.

Figure 3:
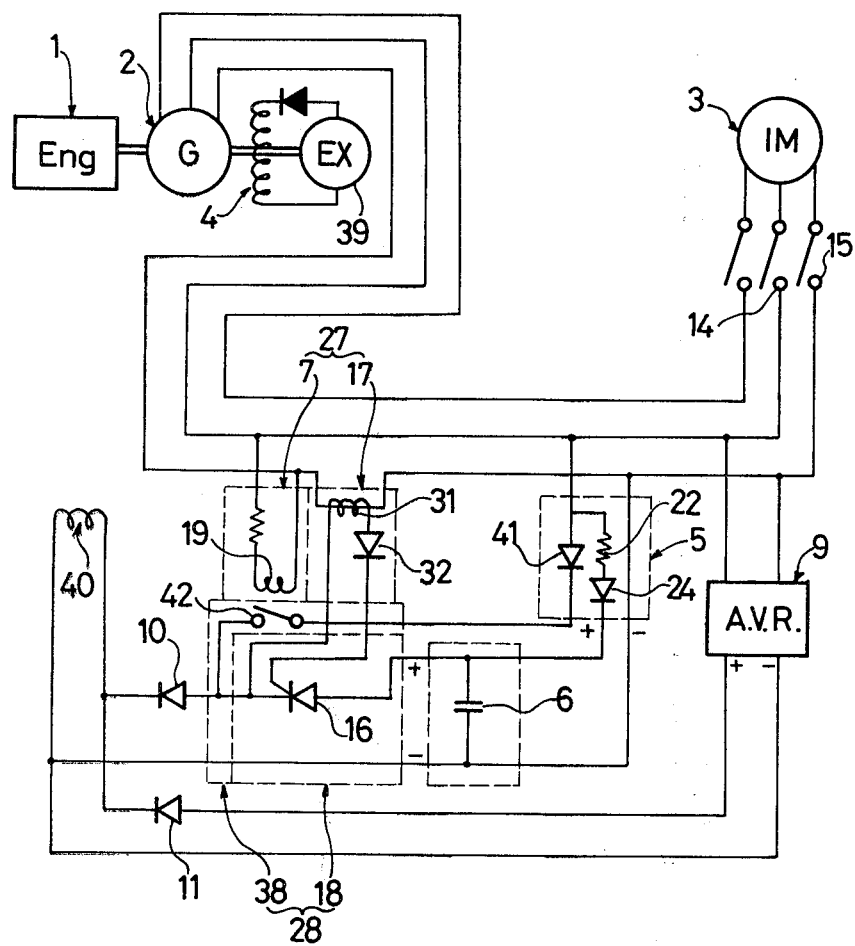
FIG. 3 is a schematic diagram showing another embodiment of the present invention.

FIG. 3 shows another embodiment embodying the present invention in a so-called brushless self-excited AC generator, wherein an exciter including an armature 39 and a field winding 40 is additionally equipped with a generator 2. In this embodiment, a field current control circuit 28 is provided for controlling the field current of said field winding 40 of said exciter.

The field winding 40 of the exciter is connected between the positive and negative terminals of the automatic voltage regulator 9 which is connected between the output terminals 14 and 15 of the generator 2, and the field current supplied by the automatic voltage regulator 9 is adjusted automatically when the output voltage of the generator 2 varies during the operation under the normal load.

The field current control circuit 28 is controlled by a detection circuit 27. The detection circuit 27 is arranged to have a first detection circuit 17 of the current detection type similar to that shown in FIG. 2 and a second detection circuit 7 of the voltage type similar to that shown in FIG. 1, and the field current control circuit 28 is arranged to have a first field current control circuit 18 which connects the fly-wheel capacitor 6 and the field winding 40 of the exciter in series in a closed circuit, and a second field current control circuit 38 in parallel to said control circuit 18. Second field current control circuit 18 will be described later.

The fly-wheel capacitor 6 is connected in series to the diode 24 provided within the rectifier 5 in the same way as shown in FIGS. 1 and 2, and is normally charged by the DC current produced by the diode 24. The first detection circuit 17 and the first current control circuit 18 are arranged identically to those shown in FIG. 2 and work in such a way that the current transformer 31 detects a load current larger than the normal value at the output terminals of the generator 2 and supplies a trigger current to the gate of the thyristor 16 provided within the first field current control circuit 18 so as to make it conductive.

In the rectifier 5, a diode 41 is provided in parallel to the diode 24 and connected to the generator output terminal 14, and the output of the diode 41 is connected to the second field current control circuit 38. The second field current control circuit 38 includes a contact 42 with its one end connected to the cathode of the diode 41 and with another end connected to the end of the field winding 40 corresponding to the positive terminal of the automatic voltage regulator 9, forming a circuit beginning with the generator output terminal 14, to the diode 41, to the contact 42, to the field winding 40, and back to the generator output terminal 15 in parallel to said automatic voltage regulator 9. The contact 42 in the second field current control circuit 38 constitutes with the winding 19 provided within the second detection circuit 7 an electromagnetic contactor connected between the output terminals 14 and 15, and is closed by the excitation of the winding 19 of the electromagnetic contactor (normally-closed contact). Said contact 42 is closed due to the voltage drop impressed on said winding 19 when the second detection circuit 7 detects a significant voltage fall relative to the normal value at the output of the generator 2 in the same way as explained with respect to the contact 20 of the detection circuit 7 shown in FIG. 1.

Remaining portions with the same reference numerals as used in FIGS. 1 and 2 are the identical portions to the previous embodiments.

According to this embodiment, when the output voltage of the generator 2 falls due to a load current larger than the normal value, the large load current is detected by the current transformer 31, which then turns on the thyristor 16 in the field current control circuit 18 into a conductive state so that electric energy stored in the fly-wheel capacitor 6 is discharged to the field winding 40. This causes a field current several times larger than the normal value to flow in the field winding 40 so as to sharply increase the field magnetic flux, and the output voltage of the generator 2 is controlled indirectly so as to recover the voltage drop promptly. When the fly-wheel capacitor 6 has discharged completely, the terminal voltage thereof drops, causing the first field current control circuit 18 to be open-circuited, and the rated field current is supplied from the automatic voltage regulator 9 to the field winding 40, therefore the normal state is restored as explained with respect to the embodiments shown in FIGS. 1 and 2.

In addition to the foregoing operation of the first detection circuit 17 and the first field current control circuit 18, the second detection circuit 7 of this embodiment operates on the contact 42, which is a b-contact of the electromagnetic contactor, to close in response to a voltage fall applied to the winding 19 caused by a sharp drop in the output voltage of the generator 2, resulting connecting the second field current control circuit 38 to the field winding 40, so that a DC current produced by the diode 41 in the rectifier 5 is supplied to the field winding 40 of the exciter 39. Then an electric-magnetic closed loop circuit beginning with the output terminal of the generator, to the field voltage, field current and field magnetic flux of the exciter and generator, and back to the armature voltage and generator output voltage is formed, and the field voltage and field current are sharply increased by the positive feedback amplification of the closed loop circuit, thereby restoring the output voltage of the generator 2 promptly. When the load current of the generator 2 has decreased to a rated current range, the detection circuit 7 operates on the contacts 42 to open so that the field current flowing through the second field current control circuit 38 is shut off, thereby providing automatically the rated field current from the automatic voltage regulator 9 to the field winding 40, and the normal state is restored.

According to this embodiment, when the induction motor 3 is connected to the output terminals of the generator 2, and the terminal voltage of the generator 2 drops instantaneously as in the starting the induction motor 3, the first and second detection circuits 17 and 7 operate to close the first and second field current control circuits 18 and 38, respectively. The closure of the first field current control circuit 18 causes the fly-wheel capacitor 6 to discharge the stored electric energy quickly to the field winding 40, resulting in a sharp increase in the field magnetic flux of the winding 40, while the closure of the second field current control circuit 38 forms the abovementioned electric-magnetic closed loop circuit, causes increase of the field voltage and field magnetic flux of the field winding 40 of the exciter 39 by the effect of positive feedback amplification of said self closed loop circuit. Accordingly, the self-excited AC generator of this embodiment is capable of recovering the generator output voltage promptly by the cooperative effects of the discharge of the electric energy stored in the fly-wheel capacitor 6 and the positive feedback amplification of the electric-magnetic closed loop circuit when a load current larger than the normal value flows from the generator to a load connected with the output of the generator, thereby enabling the generator to be loaded with an induction motor having a capacity as large as that of the generator and the starting the induction motor even with a provision of a smaller capacitance of the fly-wheel capacitor 6 relative to that of the embodiments of FIGS. 1 and 2.

It is apparent from the foregoing description that the control system shown in the embodiment of FIG. 3 may be connected to the field winding 4 of the generator 2 shown in FIGS. 1 and 2, and the control system shown in the embodiments of FIGS. 1 and 2 may be connected to the field winding of the exciter shown in FIG. 3.

In the present invention, there is provided a control system for a self-excited AC generator including an automatic voltage regulator for energizing the field winding of the generator or an exciter equipped with said generator, a fly-wheel capacitor connected through the rectifier to the output of the generator and normally charged by part of the generator output, a detection circuit for detecting a drop of the generator output voltage caused by a load current larger than the normal value and also detects the recovery of the generator output voltage and a field current control circuit connecting said fly-wheel capacitor to the field winding in parallel to the automatic voltage regulator, so that said fly-wheel capacitor is charged during a no-load operation or a small-load operation of the generator, and when said detection circuit detects a drop of the generator output voltage which has dropped below the normal voltage, electric energy stored in the fly-wheel capacitor is discharged through the field current control circuit to the field winding so as to supply a field current in a value several times larger than the normal value, thereby the generator output voltage can be recovered. Particularly in case where an induction motor is connected with the generator as a load, and a starting current in a value more than six times the rated current value of the induction motor flows during a start-up period of the induction motor, the voltage drop within the generator can be recovered promptly, enabling the induction motor to be started, and in consequence, the capacity of the induction motor to be operated by the generator can effectively be upgraded to an extent of the capacity of the generator.

The provision of the second field current control circuit for connecting the field winding to the output terminals of the generator in parallel to the fly-wheel capacitor in addition to the first-mentioned field current control circuit and the provision of the second detection circuit for controlling the closing and opening of the second field current control circuit to form an electric-magnetic closed loop circuit beginning with the generator output terminal, to the field voltage, field current and field magnetic flux of the generator or exciter thereof, and back to the armature voltage and generator output voltage, the field voltage and field current are increased by the effect of positive feed back amplification of said closed loop circuit, thereby recovering the field voltage and field current in addition to the quick discharging of electric energy stored in the fly-wheel capacitor to the field winding through said first field current control circuit, and further recovering the generator output voltage effectively and promptly.

What is claimed is:

1. In a control system for a self-excited alternating current generator including an automatic voltage regulator which extracts part of a generator output and supplied rectified current to a field winding of said generator or an exciter equipped with said generator so as to energize said field winding, said control system comprising:

a fly-wheel capacitor connected through a rectifier to the output of said generator and normally charged by part of the output of said generator;

a detection circuit provided at the output of said generator and adapted to detect a drop of the output terminal voltage caused by a load current at the output of said generator in a value larger than a predetermined value and adapted to detect the recovery of said output terminal voltage; and a field current control circuit adapted to close a circuit for connecting said fly-wheel capacitor to said field winding in parallel to said automatic voltage regulator when said detection circuit detects a drop of the output terminal voltage of said generator, and adapted to open said circuit for connecting said fly-wheel capacitor to said field winding when said detection circuit detects the recovery of the generator output terminal voltage, whereby electric energy stored in said fly-wheel capacitor is discharged to said field winding for supplying a field current in a value several times larger than a normal field current value when said detection circuit detects the drop of the output terminal voltage of said generator, thereby said voltage drop of the output terminal of said generator is recovered.

2. A control system according to claim 1, wherein said detection circuit is of a voltage-detection type including an electromagnetic contactor and said field current control circuit includes a thyristor which is brought into a conductive state when said electromagnetic contactor in said detection circuit operates to supply a trigger current to the gate of said thyristor.

3. A control system according to claim 1, wherein said detection circuit is of a current-detection type including a current transformer and a diode and said field current control circuit includes a thyristor which is brought into a conductive state when a current flowing in said current transformer in said detection circuit is supplied as a trigger current to the gate of said thyristor.

4. A control system according to claim 1, wherein said field current control circuit is connected through a reverse-current blocking diode to said field winding.

5. A control system according to claim 4, wherein said automatic voltage regulator has a terminal connected through a reverse-current blocking diode to a line connecting said field winding to said field current control circuit.

6. In a control system for a self-excited alternating current generator including an automatic voltage regulator which extracts part of generator output and supplies rectified current to a field winding of said generator or an exciter equipped with said generator so as to energize said field winding, said control system comprising:

a fly-wheel capacitor connected through a rectifier to the output of said generator and normally charged by part of the output of said generator;

a detection circuit provided at the output of said generator and adapted to detect a drop of the output terminal voltage caused by a load current at the output of said generator in a value larger than a predetermined value and adapted to detect the recovery of said output terminal voltage;

a first field current control circuit adapted to close a circuit for connecting said fly-wheel capacitor to said field winding in parallel to said automatic voltage regulator when said detection circuit detects a drop of the output terminal voltage of said generator, and adapted to open said circuit for connecting said fly-wheel capacitor to said field winding when said detection circuit detects the recovery of the generator output terminal voltage; and a second field current control circuit connected to the output of said generator in parallel to said automatic voltage regulator and in series to a rectifier and said field winding, and adapted to close said circuit so as to supply a current through said rectifier to said field winding when said detection circuit detects a drop of the generator output terminal voltage and adapted to open said circuit when said detection circuit detects the recovery of the generator output terminal voltage, whereby electric energy stored in said fly-wheel capacitor is discharged to said field winding for supplying a field current in a value several times larger than a normal field current value when said detection circuit has detected a drop of the output terminal voltage of said generator and the field voltage and field current are increased by the effect of positive feedback amplification of an electric-magnetic closed loop circuit beginning with the generator output terminal, to a field voltage, field current field magnetic flux, armature voltage, and back to the generator output terminal voltage formed through said closed second field current control circuit.

7. A control system according to claim 6, wherein said field current control circuit is connected through a reverse-current blocking diode to said field winding.

8. A control system according to claim 7, wherein said automatic voltage regulator has a terminal connected through a reverse-current blocking diode to a line connecting said field winding to said field current control circuit.

* * * * *